US006785760B2

(12) United States Patent
Asselin (10) Patent No.: US 6,785,760 B2
(45) Date of Patent: Aug. 31, 2004

(54) PERFORMANCE OF A PCI-X TO INFINIBAND BRIDGE

(75) Inventor: Albert Andre Asselin, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 10/033,487

(22) Filed: Oct. 19, 2001

(65) Prior Publication Data

US 2003/0079075 A1 Apr. 24, 2003

(51) Int. Cl.[7] .............................................. G06F 13/36
(52) U.S. Cl. ...................................... 710/315; 710/306
(58) Field of Search ............................... 710/305–315, 710/2, 300

(56) References Cited

U.S. PATENT DOCUMENTS

| | | | |
|---|---|---|---|
| 5,390,173 A | 2/1995 | Spinney et al. ............... 370/60 |
| 5,612,957 A | 3/1997 | Gregerson et al. .......... 370/401 |
| 5,796,963 A | 8/1998 | Odom ......................... 395/308 |
| 5,835,741 A | 11/1998 | Elkhoury et al. ........... 395/309 |
| 5,838,935 A | 11/1998 | Davis et al. ................. 395/309 |
| 5,864,747 A | 1/1999 | Clark et al. .................. 455/3.2 |
| 5,918,028 A | 6/1999 | Silverthorn et al. ........ 395/309 |
| 6,003,105 A | 12/1999 | Vicard et al. ............... 710/129 |
| 6,098,110 A | 8/2000 | Witkowski et al. ......... 709/249 |
| 6,134,622 A | 10/2000 | Kapur et al. ................ 710/128 |
| 6,173,341 B1 | 1/2001 | Emerson et al. ............... 710/8 |
| 6,195,720 B1 | 2/2001 | Abiven et al. .............. 710/128 |
| 6,658,521 B1 * | 12/2003 | Biran et al. ................. 710/315 |
| 6,662,249 B2 * | 12/2003 | Haren .......................... 710/65 |
| 2001/0049740 A1 * | 12/2001 | Karpoff ....................... 709/231 |

FOREIGN PATENT DOCUMENTS

WO WO0118661 A1 * 3/2001 ........... G06F/13/38

OTHER PUBLICATIONS

"PCI Type 1 Configuration in Type 0 Only Systems," *IBM Technical Disclosure Bulletin*, vol. 38, No. 12, Dec. 1995, pp. 485–489.

* cited by examiner

Primary Examiner—Sumati Lefkowitz
(74) Attorney, Agent, or Firm—Winstead Sechrist & Minick (57) ABSTRACT

Communication from a processor in a computer system to a remote input/output (I/O) unit in an expansion drawer using a Peripheral Component Interface (PCI) protocol is optimized to improve system performance. An InfiniBand (IB) protocol link is used to couple the I/O unit to the computer system. In one case the computer system uses a PCI to IB bridge to couple from the processor to a corresponding IB to PCI bridge in the expansion drawer which couples to the I/O unit using a PCI link. Intelligence is added to the PCI to IB bridge to optimize communication by assigning selected PCI command sequences to optimized Macro IB commands. The IB to PCI link has like intelligence to receive and convert the Macro IB commands to the corresponding selected PCI command sequences. Optimization is accomplished by either a learning routine or by a logic state machine that generate the optimized Macro commands. In other embodiments, a modified operating system (OS) or software running on an unmodified OS intercepts PCI commands and generate the Macro IB commands which are sent to the IB to PCI bridge via a host communication adapter (HCA). In other embodiments, device drivers are linked to a library of software routines which intercept the PCI commands. In this case, the library generates the optimized Macro IB commands.

48 Claims, 6 Drawing Sheets

PERFORMANCE OF A PCI-X TO INFINIBAND BRIDGE

TECHNICAL FIELD

The present invention relates in general to methods improving the performance of hardware units used to bridge from one communication standard protocol to devices with a second communication protocol.

BACKGROUND INFORMATION

Peripheral Component Interconnect (PCI) is a peripheral bus commonly used in personal computers (PCs), Apple Macintoshes, and workstations. It was designed primarily by Intel and first appeared on PCs in late 1993. PCI provides a high-speed data path between the central processing unit (CPU) and peripheral devices (e.g., video, disk, networks, etc.). There are typically three or four PCI slots on the motherboard. In a Pentium PC, there is generally a mix of PCI and Industrial Standard Architecture (ISA) slots or PCI and Extended ISA (EISA) slots. Early on, the PCI bus was known as a "local bus."

PCI runs at 33 MHz, supports 32 and 64-bit data paths and bus mastering. PCI Version 2.1 calls for 66 MHz, which doubles the throughput. There are generally no more than three or four PCI slots on the motherboard, which is based on 10 electrical loads that deal with inductance and capacitance. The PCI chipset uses three loads, leaving seven for peripherals. Controllers built onto the motherboard use one, whereas controllers that plug into an expansion slot use 1.5 loads. A "PCI bridge" may be used to connect two PCI buses together for more expansion slots.

PCI Extended (PCI-X) is an enhanced PCI bus from IBM, HP and Compaq that is backward compatible with existing PCI cards. It uses a 64-bit bus with a clock speed as high as 133 MHz, providing a large jump in speed from the original PCI bus at 132 MBytes/sec to as much as 1 GBytes/sec.

InfiniBand (IB) is an input/output architecture that is expected to replace the PCI-X bus in high-end servers. Supporting both copper wire and optical fibers and originally known as "System I/O," IB is a combination of Intel's Next Generation I/O (NGIO) and Future I/O from IBM, HP and Compaq. Unlike the PCI's bus technology, IB is a point-to-point switching architecture, providing a data path of from 500 MBps to 6 GBps between each pair of nodes at distances orders of magnitude greater than PCI or PCI-X allow.

One of the interesting applications being explored is to "lengthen" and expand the PCI bus by adding a PCI to IB bridge to the Host system and connecting it to an expansion drawer via an IB link (as described in U.S. Pat. No. 6,003,105). In this model, the PCI to IB bridge monitors areas of the PC's PCI bus, translates the PCI commands to equivalent IB commands, and forwards transactions to a remote expansion unit (drawer). An IB to PCI bridge in the expansion drawer receives the transactions over the IB link, converts them back to their equivalent PCI commands, and reissues them on the PCI bus in the expansion drawer. Similar results may be achieved by adding a standard IB Host communication adapter (HCA) to the Host system (instead of the PCI to IB bridge) and writing a device driver that uses IB APIs to send IB commands to the IB to PCI bridge located in the expansion drawer which the bridge translates to equivalent PCI commands and issues to the PCI device. Another solution may add or modify Host software to monitor calls to the operating system PCI API and generate the equivalent IB commands, which are again sent to the IB to PCI bridge in the expansion drawer.

This model of translating and forwarding IB commands to the expansion drawer has drawbacks since the IB and PCI semantics do not exactly match and performance may suffer. Performing an IB command may also have much more latency than its equivalent PCI command if the Host and I/O devices are located great distances apart. For example, storage adapters often use a model similar to the following:

1. The device driver allocates a command block from its internal pool of blocks, initializes the block, and then does a single 32 bit PCI write to an adapter register with the physical address of the block. Typically the driver always writes the address to the same device register.
2. The device hardware usually puts the data from the write operation into a queue and then interrupts the firmware on the adapter. The firmware pulls the address from the queue and then programs a direct memory access (DMA) logic engine to copy the command block referenced by the address from the Host's memory to the adapter's memory. The block of data is usually a fixed size.
3. The adapter analyses the command and determines if more data is required (such as writing to a disk) and if more data is required the adapter programs its DMA engine to move the rest of the data from the Host at the address(es) provided in the command block in the adapter's memory.
4. The adapter executes the command.
5. If there is result data for the Host (i.e., a disk read), the adapter uses a DMA to send the data back to the Host at address(es) provided in the command block.
6. The adapter then interrupts the Host.
7. Finally, the Host's device driver reads the interrupt status register on the adapter, recognizes that the adapter has issued the interrupt, and then reads another hardware register which retrieves the first element in the status queue and completes the original Host I/O request.

If a direct translation is done from the preceding PCI commands to IB commands (either by software in the Host or by a PCI to IB bridge) the resulting sequence of IB commands may look like the following:

1. (Driver writes command address) Host to expansion drawer: Remote direct memory access (RDMA) 32-bits to a fixed address (the device's command register). RDMA is an IB specific command.
2. (PCI adapter starts fetching command block) Expansion drawer to Host: RDMA fixed sized block (of data) from the Host address provided in step 1 of this sequence.
3. (PCI adapter starts fetching data if more data is required) Expansion drawer to Host: RDMA a variable sized block from Host address(es) provided in the command block.
4. (PCI adapter starts sending data if there is result data for the Host) Expansion drawer to Host: RDMA variable sized block to variable Host address(es) provided in the command block.
5. (PCI adapter raises interrupt) Expansion drawer to Host: Send (with a SEND command) a small packet that tells the Host system that a PCI interrupt has been raised. SEND is an IB specific command. SEND is issued because there is no direct equivalent to a PCI interrupt in the IB specification.

6. (Driver reads the interrupt status register) Host to expansion drawer: RDMA 32-bits from a fixed address (the device's interrupt status register).
7. (Driver reads the status queue) Host to expansion drawer: RDMA 32-bits from a fixed address (the devices status queue).

The problem with this translation is that the seven round trips required may be slow when run over one of the reliable IB protocols. There is, therefore, a need for a method to improve the communication performance between PCI protocol units and IB protocol units when bridge units are available and to improve performance when bridge units are not available.

SUMMARY OF THE INVENTION

Device drivers, using the Peripheral Component Interconnect (PCI) protocol and designed to communicate with PCI I/O devices over the PCI local bus, are incorporated with PCI to InfiniBand (IB) and IB to PCI bridge units. An expansion drawer incorporates an IB to PCI bridge unit to communicate with PCI I/O adapter units in a local bus configuration. The expansion drawer communicates with the PCI to IB bridge unit in the Host system over an IB link. In one embodiment of the present invention, hardware is added to the bridge units to monitor the PCI commands issued on the local bus of the Host system. The hardware learns the PCI command sequences for PCI I/O device transactions. These PCI command sequences are optimized for the PCI transactions and stored for subsequent use. When the device driver issues a request for a PCI transaction, the stored data is searched to determine if optimized sequences have been generated and stored. If optimized PCI command sequences have been generated for the PCI transaction, then the optimized sequences are substituted and sent to the PCI to IB bridge. If optimized PCI command sequences do not exist, then the standard PCI commands are sent to the PCI to IB bridge unit. In another embodiment, a state machine is added to the bridge units that is designed to issue optimized PCI command sequences in response to a PCI transaction request. The state machine may be referenced to a PCI I/O device using a PCI I/O device identification value supplied by the manufacturer.

In another embodiment, where a PCI to IB bridge unit is not in the Host system, software is added to the OS to monitor the PCI commands issued by the device drivers through the OS's PCI APIs. The software learns the PCI command sequences for PCI I/O device transactions. These PCI command sequences are optimized for the PCI transactions and stored for subsequent use. When the device driver issues a request for a PCI transaction, the stored data is searched to determine if optimized sequences have been generated for the PCI transaction. The software then substitutes the optimized sequences and sends them, via the Host communication adapter (HCA), to the PCI to IB bridge. If optimized PCI command sequences do not exist, then the standard PCI commands are sent to the PCI to IB bridge. In another embodiment, a state machine is added to the OS that is designed to issue optimized PCI commands in response to the PCI transaction request. The state machine may be referenced to a particular PCI I/O device using a PCI I/O device identification (ID) value supplied by the manufacture of the I/O device.

In another embodiment, where a PCI to IB bridge is not in the Host system, the OS's PCI APIs are extended with new APIs that help to optimize the performance of the system. For example, a new API may be added with the express purpose of clearing selected bits in a byte. Software is also added to the OS to monitor the PCI commands issued by the device drivers through the OS's APIs to optimize the PCI command sequences. The software learns the PCI command sequences for PCI I/O device transactions. These PCI command sequences are optimized for the PCI transactions and stored for subsequent use. When the device driver issues a request for a PCI transaction, the stored data is searched to determine if optimized sequences have been generated for the PCI transaction. The software then substitutes the optimized sequences and sends them, via the Host communication adapter (HCA), to the PCI to IB bridge. If optimized PCI command sequences do not exist, then the standard PCI commands are sent to the PCI to IB bridge. In another embodiment, a state machine is added to the OS that is designed to issue optimized PCI commands in response to the PCI transaction request. The state machine may be referenced to a particular PCI I/O device using a PCI I/O device identification (ID) value supplied by the manufacture of the I/O device.

In another embodiment of the present invention, where a PCI to IB bridge is not in the Host system, a layer of software is added between the OS and the device drivers to monitor the PCI commands issued by the device drivers. The software layer intercepts the PCI API calls that the device driver issues and either forwards them to the OS (if the calls reference a PCI device attached to a local PCI bus) or converts them to IB commands and sends them to the IB to PCI bridge via the IB HCA. The software learns the PCI command sequences for PCI I/O device transactions. These PCI command sequences are optimized for the PCI transactions and stored for subsequent use. When the device driver issues a request for a PCI transaction, the stored data is searched to determine if optimized sequences have been generated for the PCI transaction. The software then substitutes the optimized sequences and sends them, via the Host communication adapter (HCA), to the PCI to IB bridge. If optimized PCI command sequences do not exist, then the standard PCI commands are sent to the PCI to IB bridge. In another embodiment, a state machine is added to the OS that is designed to issue optimized PCI commands in response to the PCI transaction request. The state machine may be referenced to a particular PCI I/O device using a PCI I/O device identification (ID) value supplied by the manufacture of the I/O device.

In another embodiment where a PCI to IB bridge is not in the Host system, a library of software is compiled and/or linked with the device driver source code to produce a new device driver object module. The library of software intercepts the PCI API calls that the device driver issues and either forwards them to the OS (if the calls reference a PCI device attached to a local PCI bus) or converts them to IB commands and sends them to the IB to PCI bridge via the IB HCA. The software learns the PCI command sequences for PCI I/O device transactions. These PCI command sequences are optimized for the PCI transactions and stored for subsequent use. When the device driver issues a request for a PCI transaction, the stored data is searched to determine if optimized sequences have been generated for the PCI transaction. The software then substitutes the optimized sequences and sends them, via the Host communication adapter (HCA), to the PCI to IB bridge. If optimized PCI command sequences do not exist, then the standard PCI commands are sent to the PCI to IB bridge. In another embodiment, a state machine is added to the OS that is designed to issue optimized PCI commands in response to the PCI transaction request. The state machine may be referenced to a particular PCI I/O device using a PCI I/O device identification (ID) value supplied by the manufacture of the I/O device.

In another embodiment where a PCI to IB bridge is not in the Host system, a library of software is compiled and/or linked with the device driver source code to produce a new device driver object module. The library of software intercepts the PCI API calls that the device driver issues and provides new APIs that help to optimize the performance of the system. For example, a new API may be added with the express purpose of clearing selected bits in a byte. The library of software intercepts the PCI API calls that the device driver issues and either forwards them to the OS (if the calls reference a PCI device attached to a local PCI bus) or converts them to IB commands and sends them to the IB to PCI bridge via the IB HCA. The software learns the PCI command sequences for PCI I/O device transactions. These PCI command sequences are optimized for the PCI transactions and stored for subsequent use. When the device driver issues a request for a PCI transaction, the stored data is searched to determine if optimized sequences have been generated for the PCI transaction. The software then substitutes the optimized sequences and sends them, via the Host communication adapter (HCA), to the PCI to IB bridge. If optimized PCI command sequences do not exist, then the standard PCI commands are sent to the PCI to IB bridge. In another embodiment, a state machine is added to the OS that is designed to issue optimized PCI commands in response to the PCI transaction request. The state machine may be referenced to a particular PCI I/O device using a PCI I/O device identification (ID) value supplied by the manufacture of the I/O device.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art. In this disclosure InfiniBand (IB) and Peripheral Component Interconnect (PCI) and PCI Extended (PCI-X) commands are used interchangeably with IB and PCI and PCI-X protocol commands. Also, PCI compatible commands may be used to imply both PCI and PCI-X commands for simplicity.

Refer now to the drawings wherein depicted elements are not necessarily shown to scale and wherein like or similar elements are designated by the same reference numeral through the several views.

The PCI and PCI-X are evolutionary standards while the IB standard is sometimes referred to as revolutionary. While IB offers greatly improved performance, it will require time for the devices to support the standard to be widely available. Personal Computer (PC) and server systems that have processors which support the IB standard may become available quicker than IB compatible I/O devices. In some instances, a PCI to IB bridge and PCI expansion drawer may be added to PCs to bridge this gap. In other cases, costs may dictate that this type of bridge may not be added and software changes would be used to enable the expansion drawer instead. In this case, the obvious method would be to rewrite the I/O device driver code to issue the required commands to the IB to PCI bridge within the drawer which would then convert them to the correct PCI commands. While this may work, it may not be a practical solution. For example, the vendor of an expansion drawer may not have access to the source code of all the PCI device drivers the vendor wishes to enable. The vendor may also find it difficult to persuade the makers of the PCI adapter to make necessary changes. Customers may also reject an obvious solution because it requires that there be different versions of the device driver; one for the PCI device attached to the local bus and one for the PCI device located in an expansion drawer. Embodiments of the present invention use one PCI device driver module to control a PCI device located on either a local PCI bus or in an expansion drawer. Methods in other embodiments of the present invention reduce the amount of code changes required to produce a device driver module that is able to control a PCI device located on either a local PCI bus or in an expansion drawer.

An operating system (OS), for example, Windows, Linux, and Netware, require driver designers to access PCI adapters through OS exported Application Program Interface (APIs). APIs constitute a language and message format used by an application program to communicate with the operating system or some other control program such as a database management system (DBMS) or communications protocol. APIs are implemented by writing function calls in the program, which provide the linkage to the required subroutine for execution. Thus, an API implies that some program module is available in the computer to perform the operation or that it must be linked into the existing program to perform the tasks. Using this method for accessing PCI adapters creates a point of control so that the OS or other software may intercept and redirect commands to the IB stack. This feature may allow the modification of the OS while leaving the device drivers unchanged. For example, if a Windows driver issues a WRITE_REGISTER_ULONG, Windows may take the parameters to the API, create an appropriate IB packet, and send it to the remote IB to PCI bridge. The decision whether to create and send the IB packet (instead of issuing the command to the local PCI bus) may be done dynamically for each call to allow a single device driver image to control several PCI adapters; some local to the PC and others in the remote expansion drawer. In this case, no changes to the driver are required, however, performance may suffer because of the number of communication "round trips" between the PCI device and the Host. A variation of this method would leave the OS unmodified and instead separate software that intercepts the OS APIs would perform the above described operations.

If access to the device driver source code is allowed, a header file and/or library may be compiled and/or linked to the driver that "overrides" the OS supplied PCI access functions and creates appropriate IB packets from the parameters. The API may also include new functions that allow the driver designer to make minor changes to the device driver source code that will present hints to the library to optimize performance. For example, assume a driver operation intends to read a PCI register, clear a bit, and then write the new value back to the same location. The driver may call a new API command that provides this complete behavior rather than calling the individual read API followed by the write API. The IB library may be able to send one packet to the expansion drawer and have it locally do the read-modify-write rather than sending one packet to do the read followed by another packet to do the write operation. If the PCI library is controlling a local PCI device, the library would call the normal OS APIs to perform the PCI read followed by the PCI write.

Another method of hooking up a Host system to an expansion drawer is to add a PCI to IB bridge to the Host system as described in U.S. Pat. No. 6,003,105. This differs from previous methods in that a hardware PCI bridge is required, whereas the above methods only require a less complex IB HCA in the Host system instead of a PCI to IB bridge. Changes to the software on the Host system translates the PCI commands to IB commands instead of the PCI to IB bridge doing the translation.

In embodiments of the present invention, where it is desired to increase system performance by reducing the number of round-trips, intelligence is added, to the added software and to the IB to PCI bridge (in embodiments that add an IB HCA to the Host system) or to the two bridges (in embodiments that add a PCI to IB bridge to the Host system), that recognizes and learns what expected flow of IB packets is required for each transaction and then optimizes the packet flow. For example, if a transaction is always started by a driver write to a particular register (e.g., offset 0x38), the added intelligence is designed to "learn" that the particular register must be the command register. If the driver always reads a particular port (e.g., port 0x24) after the adapter raises an interrupt, then the added intelligence may "infer" that the particular port is the interrupt status register. This may be achieved because many PCI adapters use very similar read/write patterns.

In the described example in the Background section for a storage adapter requiring seven round trips, embodiments of the present invention could reduce the number to five round trips as follows:

1. (Driver writes the command address) Host to expansion drawer: Send (using SEND command) a packet with the 32-bit command block address, the fixed sized block of data, and instructions to issue a PCI write to the device's command register. This is done because the intelligence on the Host side has determined that a write to the device command register will be followed by fetching the command block. The IB to PCI bridge does the PCI write of the command block address to the PCI adapter. (PCI adapter starts fetching the command block). The IB to PCI bridge fulfills the PCI request out of its buffers. If the PCI device asks for addresses that the bridge does not have, the bridge acts as before and sends an RDMA request to the Host.
2. (PCI adapter starts fetching data if more data is required) Expansion drawer to Host: RDMA variable sized block from Host address(es) provided in the command block.
3. (PCI adapter starts sending data if there is result data for the host) Expansion drawer to Host: RDMA variable sized block to Host address(es) provided in the command block.
4. (PCI adapter raises an interrupt) IB to PCI bridge does a PCI read of the adapter's interrupt status register and then does a SEND of a small packet that tells the Host system that a PCI interrupt has been raised. The small packet also contains the data from the status register. Upon receipt of the packet, the Host system begins processing the interrupt. (Driver reads the interrupt status) The Host system fulfills the request from its buffers.
5. (Driver reads status queue) Host to expansion drawer: RDMA 32-bits from fixed address.

In this example, the number of round trips is reduced thus improving the system performance.

In another embodiment of the present invention, "templates" are provided to the IB to PCI bridge device and either the PCI to IB bridge or the additional software on the Host system to help optimize the packet flow. The templates provide information such as a state machine that is patterned after the PCI device hardware and incorporates the expected ordering of register accesses. The software and/or bridges would be programmed to recognize which template to use based on a PCI device's vendor/device identification values.

In embodiments of the present invention the IB to PCI bridge unit is modified to incorporate a feature that enables optimized Macro commands to be recognized. The Macro commands are assigned a sequence of native PCI commands that are used in a PCI transaction. Whenever a host device driver issues PCI commands for a PCI transaction, sequences of these PCI commands may be assigned to a Macro command. The IB to PCI bridge, used in embodiments of the present invention is modified or programmed to recognize the Macro commands and issue the corresponding sequence of PCI commands. The assignment of a sequence of PCI commands to a Macro command may be done in several ways and still be within the scope of the present invention. The OS may be modified to intercept the PCI commands and assign them to the Macro commands. Software may be added that intercepts the PCI commands and assigns them to Macro commands while leaving the OS unmodified. Or state machines may be incorporated that receive the PCI commands and assign them to the Macro commands. In this manner a sequence of PCI commands does not have to be transmitted, rather the Macro commands are sent which are then recognized by the IB to PCI bridge. The IB to PCI bridge then reissues the sequence of PCI commands referenced by the Macro commands to the PCI I/O device over a PCI link. In all cases the IB to PCI bridge has the functionality to be "programmed" to recognize Macro commands as associated with sequences of PCI commands. Programming may mean that the IB to PCI bridge is preset to recognize known sequences of PCI commands as specific Macro commands or the IB to PCI bridge is programmable so the Host system determine which PCI sequences to assign to Macro commands. If the IB to PCI bridge is coupled over a IB link to a PCI to IB bridge, then the PCI to IB bridge is modified to allow it to transmit Macro commands over the IB link to a IB to PCI bridge that is programmed to recognize the Macro commands and convert them to corresponding PCI command sequences.

Figure 1:
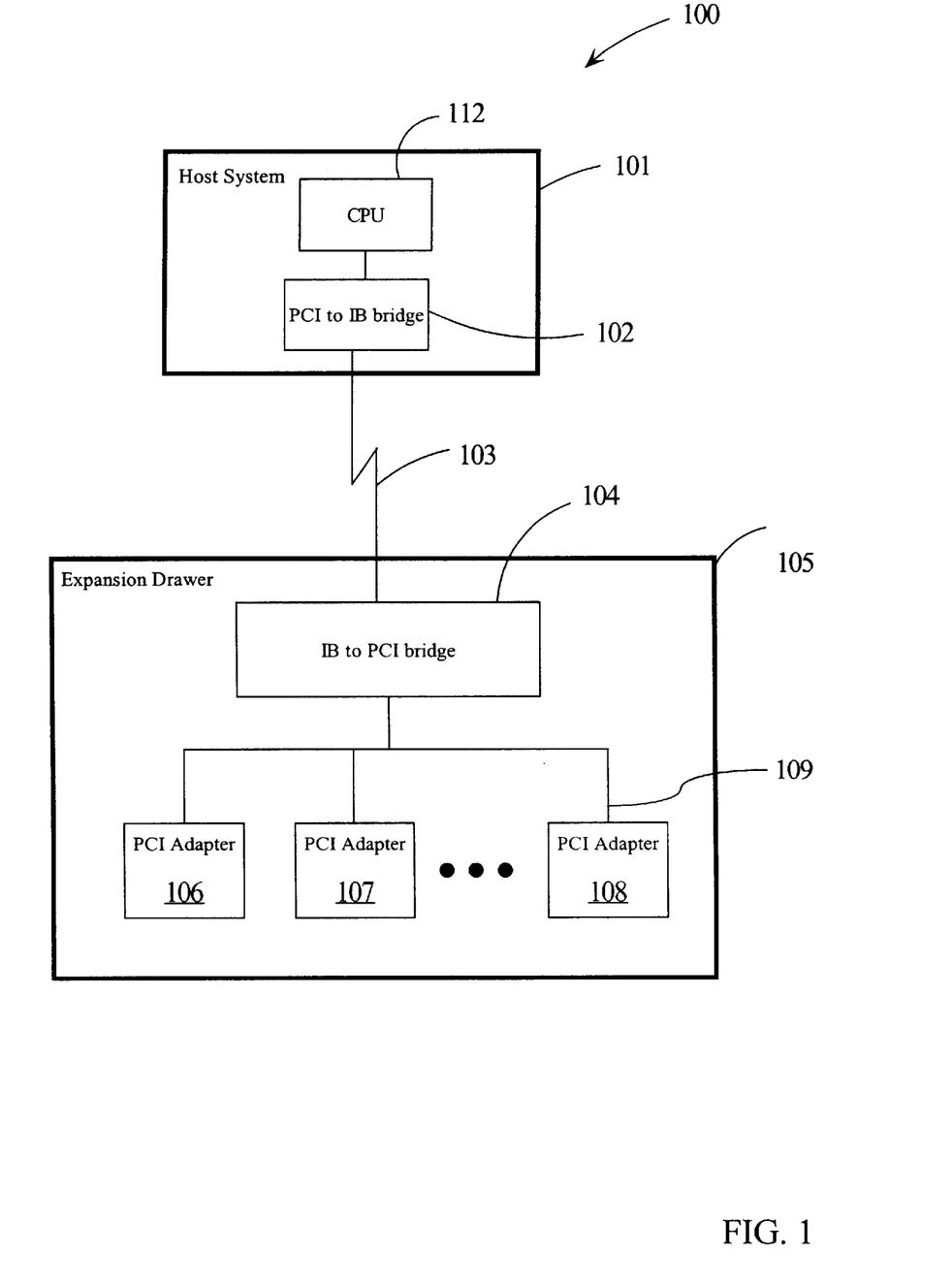
FIG. 1 is a block diagram of a Host system configured to operate with the InfiniBand (IB) protocol and an expansion drawer with PCI adapters and an IB to PCI bridge unit.

FIG. 1 is a block diagram of a computer system 100 configuration used to practice principles of the present invention. Host system 101 comprises CPU 112 and PCI to IB bridge unit 102. PCI to IB bridge unit 102 couples CPU 112 to an IB link 103 and converts PCI compatible commands to IB compatible commands. IB link 103 couples to IB to PCI bridge unit 104 which converts the IB compatible commands to PCI compatible commands and couples to a PCI network 109 which couples exemplary PCI adapters 106–108. The IB to PCI bridge unit 104 and PCI adapters 106–108 are housed in and Expansion drawer 105. A PCI adapter includes the PCI I/O device itself. PCI command sequences are generated in Host System 101 when a device driver issues a request for a PCI transaction. The PCI to IB bridge in Host System 101 may be modified to assign sequences of PCI commands to Macro commands according to embodiments of the present invention. PCI to IB bridge 102 is also modified to send the Macro commands over the IB link to the IB to PCI bridge 104 which is also modified to accept the Macro commands and convert them back into their corresponding PCI command sequences. However the assignment is accomplished, a reduced set of commands are required to be sent over the IB link 103 reducing the communication round trips and increasing system performance.

Figure 2:
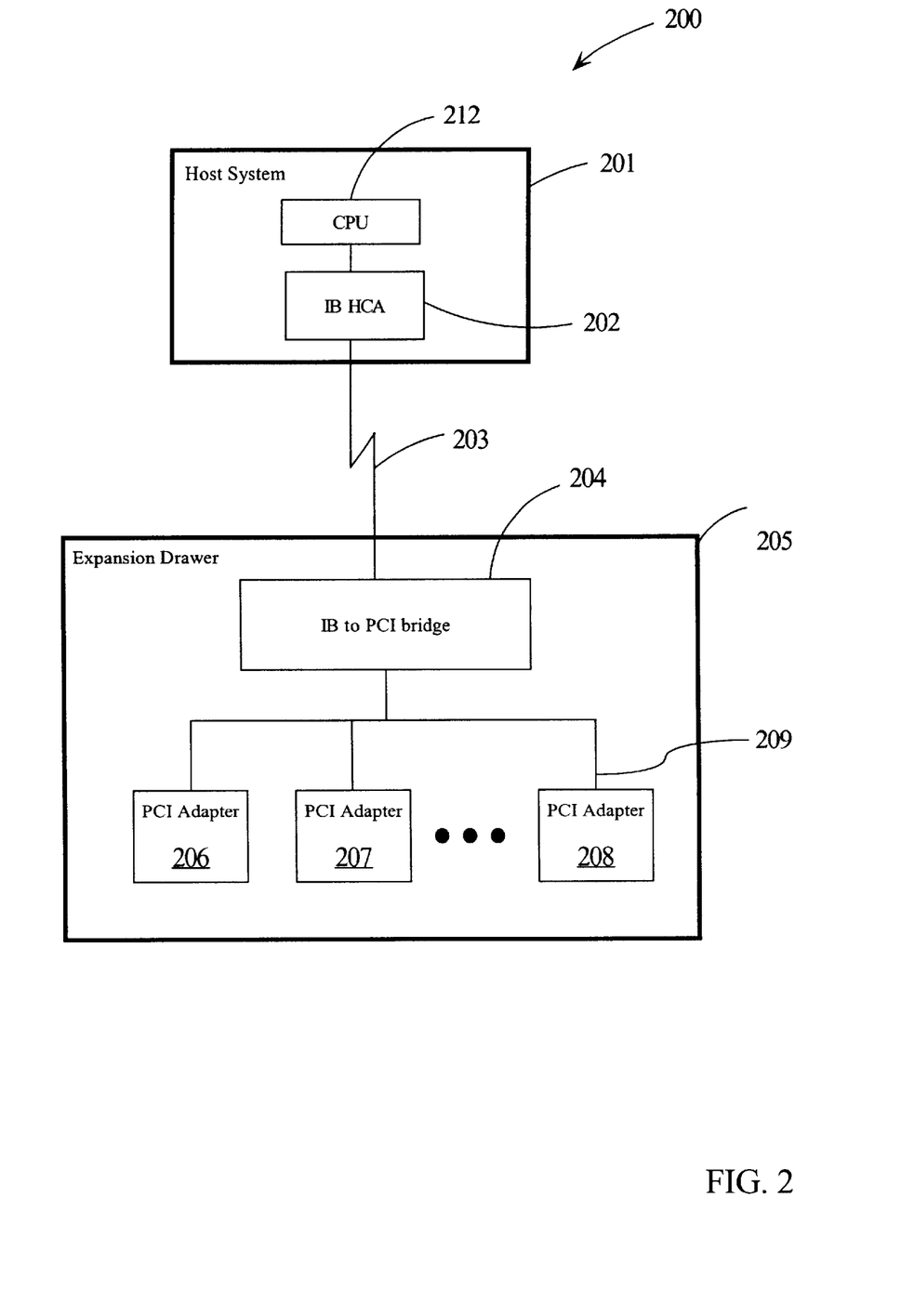
FIG. 2 is a block diagram of a Host system configured to operate with the IB protocol and an expansion drawer with PCI adapters and an IB to PCI bridge unit.

FIG. 2 is a block diagram of another system 200 configuration used to practice principles of the present invention. Host system 201 comprises CPU 212 and host communication adapter (HCA) 202. HCA 202 couples CPU 212 to an IB link 203 and IB link 203 couples to IB to PCI bridge unit 204. IB to PCI bridge unit 204 converts the IB compatible commands to PCI compatible commands and couples to a PCI network 209 which interfaces with exemplary PCI adapters 206–208. The IB to PCI bridge unit 204 and PCI adapters 206–208 are housed in and Expansion drawer 205. In this configuration, embodiments of the present invention may assign PCI command sequences to Macro commands by a modified device driver, by a modified OS that intercepts the PCI commands sequences, by software that operates on an un-modified OS, by APIs, or by a state machine within the PCI to IB bridge unit itself. However the assignment is accomplished, a reduced set of commands are required to be sent over the IB link 103 reducing the communication round trips and increasing system performance.

Figure 3:
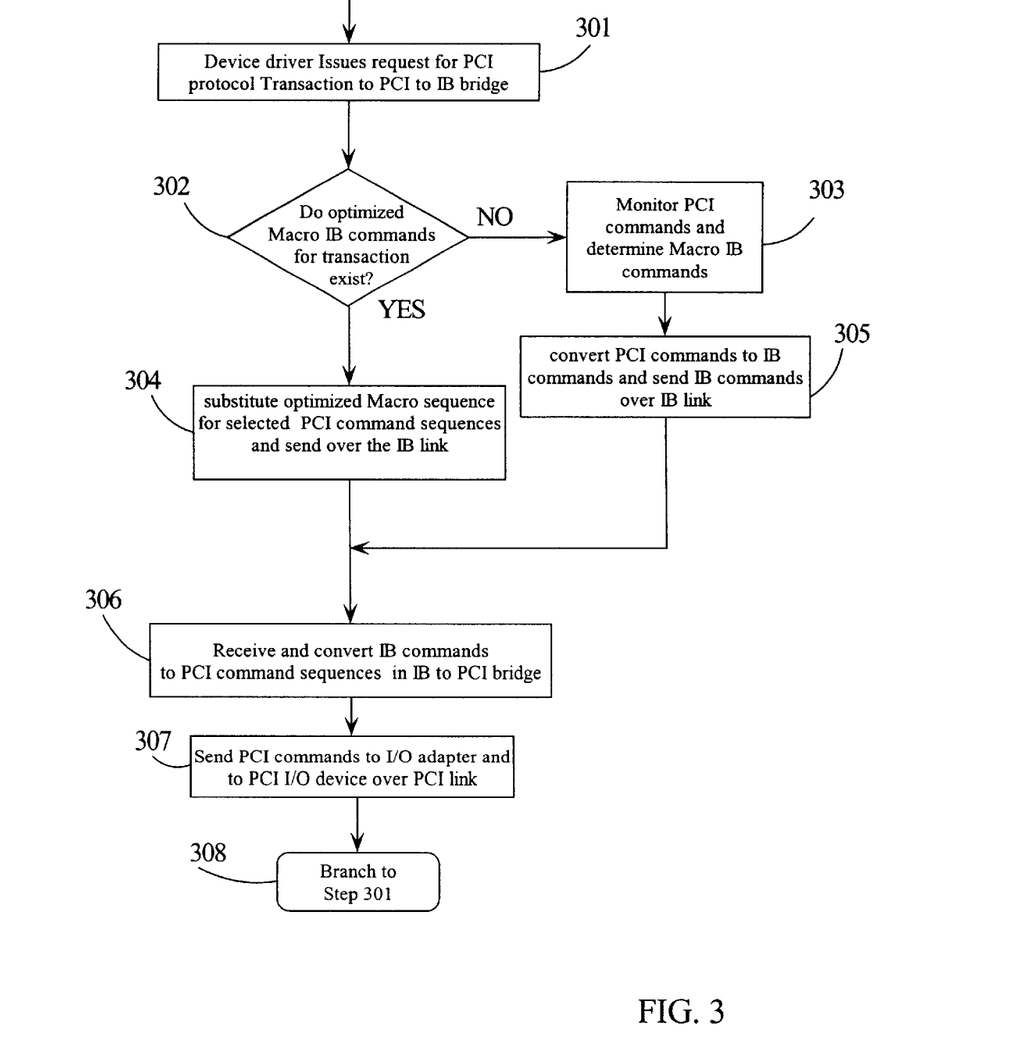
FIG. 3 is a flow diagram of method steps in one embodiment of the present invention.

FIG. 3 is a flow diagram of method steps in one embodiment of the present invention where the first protocol is PCI and the second protocol is IB. In step 301, an unmodified device driver issues a request for a PCI protocol transaction to a PCI device (e.g., 106–108) which is intercepted by a PCI to IB bridge 102. In step 302, a test is done to determine if optimized Macro commands for the PCI protocol command sequences have been generated for the PCI transaction where the PCI protocol commands are to be first converted to IB protocol commands. If the result of the test in step 302 is YES, then in step 304 the optimized Macro commands are substituted for the supplied PCI transaction and sent over IB link 103. In step 306, the IB protocol commands are received in the IB to PCI bridge unit 104 and converted back to corresponding PCI command sequences. In step 307, the PCI commands are then sent to a PCI adapter (e.g., 106). In step 308 a branch is taken back to step 301 awaiting another request. If the result of the test in step 302 is NO, then in step 303 the PCI command sequences are monitored and recognized sequences are assigned to Macro commands for future use. In step 305, PCI commands are converted to IB protocol commands and sent over IB link 103. When the PCI command sequences are assigned to Macro commands, the IB to PCI bridge 104 has either been preset to recognize the Macro commands or it is programmable to recognize the Macro commands and generated the corresponding PCI command sequences.

Figure 4:
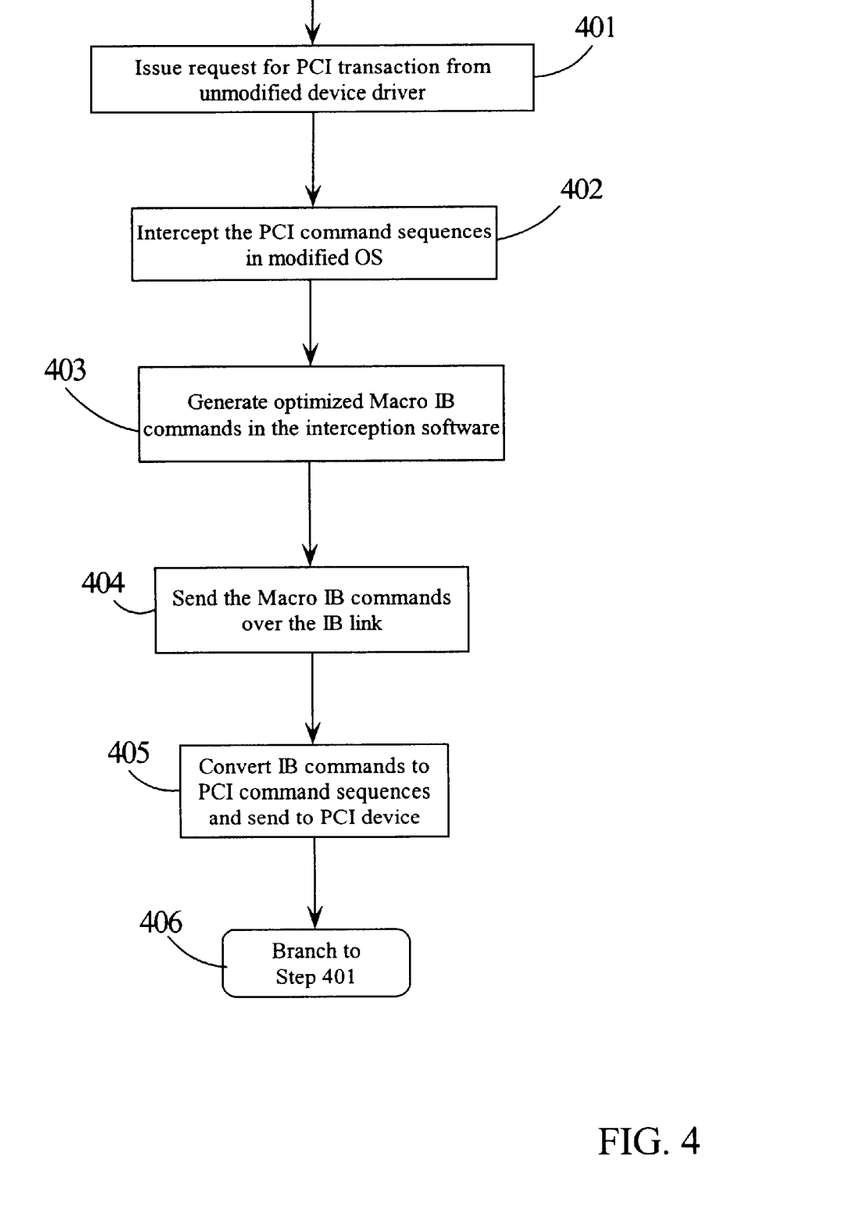
FIG. 4 is a flow diagram of method steps in another embodiment of the present invention.

FIG. 4 is a flow diagram of method steps in an embodiment of the present invention where the device driver is not modified but it is desired to use the IB link 203. In step 401, a request is issued by the device driver for a PCI transaction for a PCI I/O device (e.g., 206) which results in a sequence of PCI commands. In step 402, the PCI command sequences are intercepted by the OS which has been modified. In step 403, the modified OS generates an optimized Macro commands for PCI command sequences. In step 404, the Macro commands are converted to corresponding IB commands in a PCI to IB bridge 102 and sent to the IB to PCI bridge 204 over IB link 203. In step 405, the IB commands are recognized as Macro commands and converted to corresponding PCI command sequences and sent to a PCI adapter (e.g., 206) over PCI link 109. In step 406, a branch is taken back to step 401 awaiting another transaction request. When the PCI command sequences are assigned to Macro commands, the IB to PCI bridge 104 has either been preset to recognize the Macro commands or it is programmable to recognize the Macro commands and generated the corresponding PCI command sequences.

Figure 5:
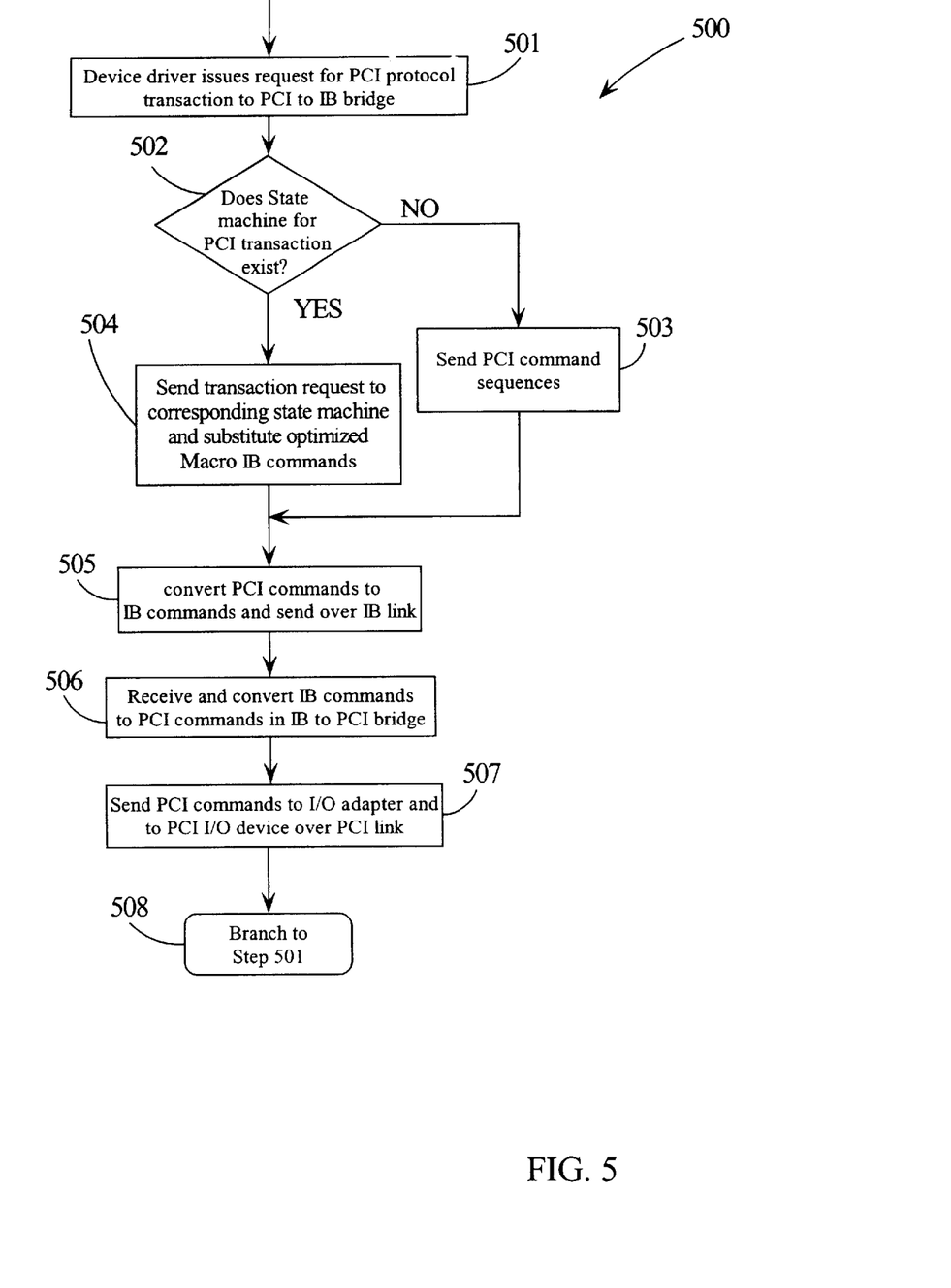
FIG. 5 is a flow diagram of yet another embodiment of the present invention.

FIG. 5 is a flow diagram of method steps in another embodiment of the present invention where state machines are added (e.g., in firmware) which have the intelligence to optimize the command sequence for a PCI transaction where the IB link is desired between a PCI system and PCI I/O devices. In this case, the state machines are configured to do the work of constructing the optimized command sequences required.

In step 501, a request is issued by a device driver in the Host system 101 which is intercepted by the PCI to IB bridge 102. In step 502, a test is done to determine if a state machine for the transaction for the PCI I/O device (e.g., 106) exists. If the result of the test in step 502 is NO, then in step 503 the normal sequence of the PCI commands is used by the PCI to IB bridge unit 102. If the result of the test in step 502 is YES, then in step 504 the PCI commands are sent to the state machine within the PCI to IB bridge 102 which substitutes optimized Macro commands. The optimized Macro commands are converted to IB commands in step 505 and sent over the IB link 103 to IB to PCI bridge unit 104. The IB commands are received and recognized as Macro commands and converted to the corresponding PCI command sequences in IB to PCI bridge 104 in step 506. In step 507, the PCI command sequences are sent to a PCI adapter (e.g., 206) over the local PCI link in the expansion drawer. In step 508, a branch is taken to step 501 awaiting another transaction. When the PCI command sequences are assigned to Macro commands, the IB to PCI bridge 104 has either been preset to recognize the Macro commands or it is programmable to recognize the Macro commands and generated the corresponding PCI command sequences.

Figure 6:
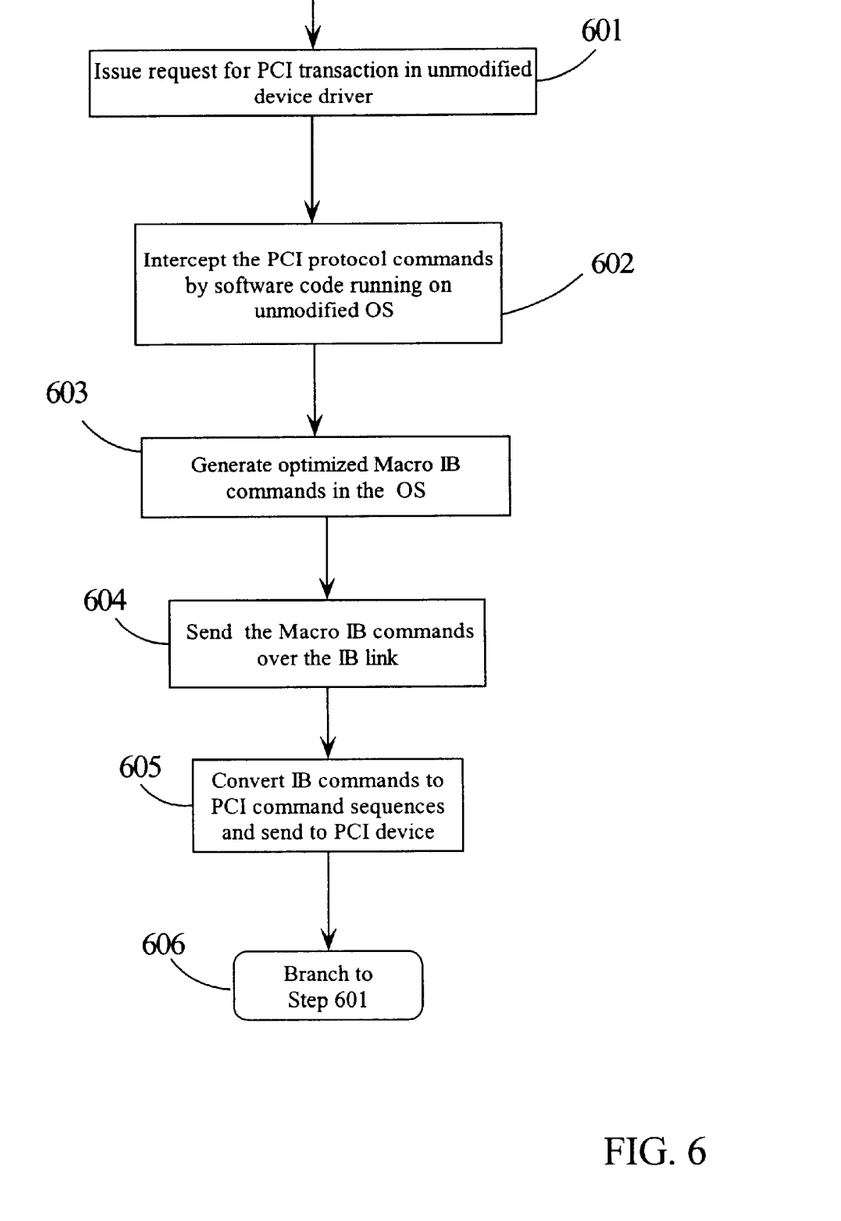
FIG. 6 is a flow diagram of method steps in an embodiment of the present invention.

FIG. 6 is a flow diagram of method steps in another embodiment of the present invention where the operation system (OS) is not modified but rather software code is run on the operating system which intercepts commands from a device driver. In step 601, a request is issued for a PCI transaction for a PCI I/O device (e.g., 206) in an unmodified device driver. In step 602, the PCI command sequences are intercepted by software code, running on the unmodified OS. In step 603, the interception software generates optimized Macro IB commands corresponding to sequences of PCI commands required for the PCI transaction. In step 604, the Macro IB commands are sent to the IB to PCI bridge 204 over IB link 203. In step 605, the Macro IB commands are recognized and are converted to PCI command sequences and sent to PCI adapter 206. In step 606, a branch is taken back to step 601 awaiting another PCI transaction request. When the PCI command sequences are assigned to Macro IB commands, the IB to PCI bridge 104 has either been preset to recognize the Macro commands or it is programmable to recognize the Macro commands and generated the corresponding PCI command sequences.

Although the present invention and its advantages have been described in detail, it should be understood that various changes, substitutions and alterations can be made herein without departing from the spirit and scope of the invention as defined by the appended claims.

What is claimed is:

1. A method for interfacing a processor using a first protocol (P1) to an input/output (I/O) device using said P1 comprising the steps of:
    coupling said processor to a second protocol (P2) link using a first bridge unit;
    coupling said first bridge unit to a second bridge unit using said P2 link;
    coupling said second bridge unit to a P1 I/O adapter using a P1 link; and
    generating in said first bridge unit optimized Macro P2 commands corresponding to selected P1 command sequences for a P1 transaction for said I/O device.

2. The method of claim 1 further comprising the steps of:
    transmitting said optimized P2 Macro commands by said first bridge unit to said second bridge unit;
    receiving said optimized P2 Macro commands by said second bridge unit and converting said optimized P2 Macro commands to corresponding of said selected P1 command sequences; and
    receiving said selected P1 commands, converted by said second bridge unit from said optimized P2 Macro commands, by said I/O device and executing said P1 transaction.

3. The method of claim 1, wherein said generating step comprises the sub-steps of:
    monitoring P1 commands generated for said P1 transaction;
    learning an expected flow of said P1 commands; and
    assigning selected P1 command sequences to said optimized P2 Macro commands.

4. The method of claim 1, wherein said generating step comprises the sub-steps of:
    receiving P1 commands generated for said P1 transaction in a logic state machine; and
    generating said P2 Macro commands corresponding to selected P1 command sequences for said P1 transaction.

5. The method of claim 1, wherein said P1 is a Peripheral Component Interface (PCI) protocol and said P2 is an InfiniBand (IB) protocol.

6. The method of claim 4, wherein said logic state machine corresponds to a particular I/O device and said logic state machine is selected based on a reference indicator for said particular I/O device.

7. A method for interfacing a processor using a first protocol (P1) to an input/output (I/O) device using said P1 comprising the steps of:
    coupling said processor to a first adapter unit;
    coupling said first adapter unit to a bridge unit using a second protocol (P2) link;
    coupling said bridge unit to a P1 I/O adapter using a P1 link;
    intercepting P1 commands for said I/O device in a modified operating system (OS) of said processor; and
    generating optimized P2 Macro commands in said modified OS corresponding to selected P1 commands for completing a P1 transaction in said I/O device.

8. The method of claim 7 further comprising the steps of:
    transmitting said optimized P2 Macro commands by said first adapter unit to said bridge unit;
    receiving said optimized P2 Macro commands by said bridge unit and converting said optimized P2 Macro commands to said corresponding selected P1 command sequences; and
    receiving said selected P1 commands, converted by said bridge unit from said optimized P2 Macro commands, by said I/O device and executing said P1 transaction.

9. The method of claim 7, wherein said generating step comprises the sub-steps of:
    monitoring P1 commands generated for said P1 transaction;
    learning an expected flow of said P1 commands; and
    assigning selected P1 command sequences to said optimized P2 Macro commands.

10. The method of claim 7, wherein said generating step comprises the sub-steps of:
    receiving P1 commands generated for said P1 transaction to a logic state machine; and
    generating said P2 Macro commands corresponding to selected P1 command sequences for said P1 transaction.

11. The method of claim 7, wherein said P1 is a Peripheral Component Interface (PCI) compatible protocol and said P2 is an InfiniBand (IB) compatible protocol.

12. The method of claim 10, wherein said logic state machine corresponds to a particular I/O device and said logic state machine is selected based on a reference indicator for said particular I/O device.

13. A method for interfacing a processor using a first protocol (P1) to an input/output (I/O) device using said P1 comprising the steps of:
    coupling said processor to a first adapter unit;
    coupling said first adapter unit to a bridge unit using a second protocol (P2) link;
    coupling said bridge unit to a P1 I/O adapter using a P1 link;
    intercepting P1 commands for said I/O device in an operating system (OS) of said processor modified by adding Application Interface (API) code; and
    generating, by a device driver issuing calls to said API code, optimized P2 Macro commands corresponding to selected P1 commands for completing a P1 transaction in said I/O device.

14. The method of claim 13 further comprising the steps of:
    transmitting said optimized P2 Macro commands to said bridge unit;

receiving said optimized P2 Macro commands by said bridge unit and converting said optimized P2 Macro commands to said corresponding selected P1 command sequences; and receiving said selected P1 commands, converted by said second bridge unit from said optimized P2 Macro commands, by said I/O device and executing said P1 transaction.

15. The method of claim 13, wherein said generating step comprises the sub-steps of:

monitoring P1 commands generated for said P1 transaction;

learning an expected flow of said P1 commands; and assigning selected P1 command sequences to said optimized P2 Macro commands.

16. The method of claim 13, wherein said generating step comprises the sub-steps of:

receiving P1 commands generated for said P1 transaction to a logic state machine; and generating said P2 Macro commands corresponding to selected P1 command sequences for said P1 transaction.

17. The method of claim 13, wherein said P1 is a Peripheral Component Interface (PCI) compatible protocol and said P2 is an InfiniBand (IB) compatible protocol.

18. The method of claim 16, wherein said logic state machine corresponds to a particular I/O device and said logic state machine is selected based on a reference indicator for said particular I/O device.

19. A method for interfacing a processor using a first protocol (P1) to an input/output (I/O) device using said P1 comprising the steps of:

coupling said processor to a first adapter unit;

coupling said first adapter unit to a bridge unit using a second protocol (P2) link;

coupling said bridge unit to a P1 I/O adapter using a P1 link;

executing software on an operating system (OS) of said processor to intercept P1 commands for said I/O device; and generating optimized P2 Macro commands in said software corresponding to selected P1 commands for completing a P1 transaction in said I/O device.

20. The method of claim 19 further comprising the steps of:

transmitting said optimized P2 Macro commands to said bridge unit;

receiving said optimized P2 Macro commands by said bridge unit and converting said optimized P2 Macro commands to said corresponding selected P1 command sequences; and receiving said selected P1 commands, converted by said second bridge unit from said optimized P2 Macro commands, by said I/O device and executing said P1 transaction.

21. The method of claim 19, wherein said generating step comprises the sub-steps of:

monitoring P1 commands generated for said P1 transaction;

learning an expected flow of said P1 commands; and assigning selected P1 command sequences to said optimized P2 Macro commands.

22. The method of claim 19, wherein said generating step comprises the sub-steps of:

receiving P1 commands generated for said P1 transaction to a logic state machine; and generating said P2 Macro commands corresponding to selected P1 command sequences for said P1 transaction.

23. The method of claim 19, wherein said P1 is a Peripheral Component Interface (PCI) compatible protocol and said P2 is an InfiniBand (IB) compatible protocol.

24. The method of claim 22, wherein said logic state machine corresponds to a particular I/O device and said logic state machine is selected based on a reference indicator for said particular I/O device.

25. A method for interfacing a processor using a first protocol (P1) to an input/output (I/O) device using said P1 comprising the steps of:

coupling said processor to a first adapter unit;

coupling said first adapter unit to a bridge unit using a second protocol (P2) link;

coupling said bridge unit to a P1 I/O adapter using a P1 link;

linking a device driver, generating P1 commands for a P1 transaction, to a library of software routines; and generating optimized P2 Macro commands in said software routines corresponding to selected P1 commands for completing said P1 transaction in said I/O device.

26. The method of claim 25 further comprising the steps of:

transmitting said optimized P2 Macro commands to said bridge unit;

receiving said optimized P2 Macro commands by said bridge unit and converting said optimized P2 Macro commands to said corresponding selected P1 command sequences; and receiving said selected P1 commands, converted by said second bridge unit from said optimized P2 Macro commands, by said I/O device and executing said P1 transaction.

27. The method of claim 25, wherein said generating step comprises the sub-steps of:

monitoring P1 commands generated for said P1 transaction;

learning an expected flow of said P1 commands; and assigning selected P1 command sequences to said optimized P2 Macro commands.

28. The method of claim 25, wherein said generating step comprises the sub-step of:

receiving P1 commands generated for said P1 transaction in a logic state machine; and generating said P2 Macro commands corresponding to selected P1 command sequences for said P1 transaction.

29. The method of claim 25, wherein said P1 is a Peripheral Component Interface (PCI) compatible protocol and said P2 is an InfiniBand (IB) compatible protocol.

30. The method of claim 28, wherein said logic state machine corresponds to a particular I/O device and said logic state machine is selected based on a reference indicator for said particular I/O device.

31. A method for interfacing a processor using a first protocol (P1) to an input/output (I/O) device using said P1 comprising the steps of:

coupling said processor to a first adapter unit;

coupling said first adapter unit to a bridge unit using a second protocol (P2) link;

coupling said bridge unit to a P1 I/O adapter using a P1 link;

linking a device driver, generating P1 commands for a P1 transaction, to a library of software routines providing Application Interface (API) code; and generating, by a device driver issuing calls to said API code, optimized P2 Macro commands corresponding to selected P1 commands for completing a P1 transaction in said I/O device.

32. The method of claim 31 further comprising the steps of:

transmitting said optimized P2 Macro commands to said bridge unit;

receiving said optimized P2 Macro commands by said bridge unit and converting said optimized P2 Macro commands to said corresponding selected P1 command sequences; and receiving said selected P1 commands, converted by said second bridge unit from said optimized P2 Macro commands, by said I/O device and executing said P1 transaction.

33. The method of claim 31, wherein said generating step comprises the sub-steps of:

monitoring P1 commands generated for said P1 transaction;

learning an expected flow of said P1 commands; and assigning selected P1 command sequences to said optimized P2 Macro commands.

34. The method of claim 31, wherein said generating step comprises the sub-steps of:

receiving P1 commands generated for said P1 transaction to a logic state machine; and generating said P2 Macro commands corresponding to selected P1 command sequences for said P1 transaction.

35. The method of claim 31, wherein said P1 is a Peripheral Component Interface (PCI) compatible protocol and said P2 is an InfiniBand (IB) compatible protocol.

36. The method of claim 34, wherein said logic state machine corresponds to a particular I/O device and said logic state machine is selected based on a reference indicator for said particular I/O device.

37. A computer system interfacing a processor using a first protocol (P1) to an input/output (I/O) device using said P1 comprising:

a first bridge unit coupling said processor to a second protocol (P2) link, said first bridge unit converting P1 commands to P2 commands;

a second bridge unit coupling from said P2 link to a P1 link, said second bridge unit converting from said P2 commands to corresponding P1 commands;

a P1 I/O adapter coupled to said P1 link and to said I/O device; and circuitry in said first bridge unit for generating optimized Macro P2 commands corresponding to selected P1 command sequences for a P1 transaction for said I/O device.

38. The computer system of claim 37 further comprising:

circuitry for transmitting said optimized P2 Macro commands by said first bridge unit to said second bridge unit; and circuitry for receiving said optimized P2 Macro commands by said second bridge unit and converting said optimized P2 Macro commands to corresponding of said selected P1 command sequences, wherein said I/O device receives said selected P1 commands converted from said optimized P2 Macro command and executes said P1 transaction.

39. The computer system of claim 37, wherein said circuitry in said first bridge unit for generating optimized Macro P2 commands comprises:

circuitry for monitoring P1 commands generated for said P1 transaction;

circuitry for learning an expected flow of said P1 commands; and circuitry for assigning selected P1 command sequences to said optimized P2 Macro commands.

40. The computer system of claim 37, wherein said circuitry in said first bridge unit for generating optimized Macro P2 commands comprises:

circuitry for receiving P1 commands generated for said P1 transaction in a logic state machine generating said P2 Macro commands corresponding to selected P1 command sequences for said P1 transaction.

41. The computer system of claim 37, wherein said P1 is a Peripheral Component Interface (PCI) protocol and said P2 is an InfiniBand (IB) protocol.

42. The computer system of claim 40, wherein said logic state machine corresponds to a particular I/O device and said logic state machine is selected based on a reference indicator for said particular I/O device.

43. A computer program product for optimizing communication from a processor to an input/output (I/O) unit using a first protocol (P1), said computer program product embodied in a machine readable medium, including programming for a processor, said computer program comprising a program of instructions for performing the program steps of:

intercepting P1 commands for a P1 transaction for said I/O unit;

generating optimized Macro second protocol (P2) commands from selected of said P1 commands; and forwarding said optimized Macro P2 commands to an adapter.

44. The computer program product of claim 43, wherein said adapter is coupled to said I/O unit via a P2 link and a bridge unit, said bridge unit coupled to said I/O unit with a P1 link.

45. The computer program product of claim 43, wherein said generating step comprises the sub-steps of:

monitoring P1 commands generated for said P1 transaction;

learning an expected flow of said P1 commands; and assigning selected P1 command sequences to said optimized P2 Macro commands.

46. The computer program product of claim 43, wherein said generating step comprises the sub-step of:

receiving P1 commands generated for said P1 transaction in a logic state machine; and generating said P2 Macro commands corresponding to selected P1 command sequences for said P1 transaction.

47. The computer program product of claim 43, wherein said P1 is a Peripheral Component Interface (PCI) compatible protocol and said P2 is an InfiniBand (IB) compatible protocol.

48. The computer program product claim 46, wherein said logic state machine corresponds to a particular I/O device and said logic state machine is selected based on a reference indicator for said particular I/O device.

* * * * *